United States Patent [19]
Lukas et al.

[11] Patent Number: 4,794,310
[45] Date of Patent: Dec. 27, 1988

[54] PHASE ANGLE CONTROL CIRCUIT FOR MOTORS

[75] Inventors: Josef Lukas; Grammenos Nicoltsios, both of Vienna, Austria

[73] Assignee: Siemens Aktiengesellschaft, Berlin and Munich, Fed. Rep. of Germany

[21] Appl. No.: 40,427

[22] Filed: Apr. 20, 1987

Related U.S. Application Data

[63] Continuation-in-part of Ser. No. 852,332, Apr. 15, 1986, abandoned.

[51] Int. Cl.$^4$ ............................................. H02P 7/14
[52] U.S. Cl. ................................. 318/342; 318/345 G
[58] Field of Search ............... 318/317, 345 B, 345 D, 318/342, 344, 345 C, 345 G, 345 H

[56] References Cited

U.S. PATENT DOCUMENTS

| | | | |
|---|---|---|---|
| 4,326,153 | 4/1982 | Contri | 318/345 D |
| 4,481,448 | 11/1984 | Bishop | 318/345 D X |
| 4,513,381 | 4/1985 | Houser, Jr. et al. | 318/345 D X |
| 4,549,122 | 10/1985 | Berkopec et al. | 318/338 |
| 4,658,192 | 4/1987 | Casteel et al. | 318/317 |

Primary Examiner—Bentsu Ro
Attorney, Agent, or Firm—Kenyon & Kenyon

[57] ABSTRACT

A control circuit for d-c motors, which are supplied by an a-c supply through phase angle control, and which obtains information regarding the actual current value from a current transformer secondary voltage, and which is utilized additionally also for detecting the point of current zero-axis crossing, which, for example, is required before a motor current direction reversal. For recognition of the current zero-axis crossings the fact is utilized, that the ends of the current pulses occurring with low motor current (interrupted current) have voltage peaks opposite to the pulse current direction, which is caused by the reduction of the residual magnetic energy of the current transformer after each current pulse. The pulses of alternating direction generated by the current transformer are converted by controlled polarity reversal into pulses of the same polarity, the current zero-axis crossing of which at the pulse end is detected with a comparator circuit at the correct time.

3 Claims, 2 Drawing Sheets

PHASE ANGLE CONTROL CIRCUIT FOR MOTORS

CROSS REFERENCE TO RELATED APPLICATIONS

This application is a continuation-in-part of U.S. Ser. No. 852,332 now abandoned, filed Apr. 15, 1986.

BACKGROUND OF THE INVENTION

The present invention relates to a phase angle control circuit for motors having a command stage and a control stage for driving thyristors of rectifier bridges, with one current transformer being provided for determining the actual value of the motor current with a single-phase a-c current supply, and two current transformers with a three-phase a-c current supply, which current transformers, in addition, are utilized for determining the current zero-axis crossing before motor current reversal and for determining the duration of the current rest time.

As is known, in order to be able to control d-c motors, knowing the actual value of the motor current is required, since automatic current regulation is subordinate to the control. With d-c motors, which are supplied from an a-c network with current obtained through phase angle control, it is customary to provide current transformers, which are connected on the primary side to the supply a-c network and from the secondary voltage of which, with the aid of a rectifier circuit, a value is obtained which represents the actual current value.

For motors which are driven in both rotational directions, two controlled rectifier bridges are customarily provided, of which, however, only one can be in operation at any given time. One must absolutely and at all cost prevent that one rectifier bridge is being operated before the other has completely stopped operating, since, otherwise, through the thyristors of different rectifier bridges, short-circuits come about which can destroy the rectifier bridges.

For the control, therefore, before initiating current direction reversal causing reversal of the direction of rotation, the exact determination of the point of zero current in the thyristors of the rectifier bridge in operation up to this point, is required for the control, before the thyristors of the other rectifier bridge, inhibited until then, are released, because a thyristor's ability to block current is only given at zero current.

It is known, to detect the actual current value required for the purpose of current regulation with the aid of current transformers, since, in general only the absolute value of the current is of interest for the regulation and the regulator is designed only for evaluating d-c current, that the secondary voltage of the current transformer is normally rectified.

If, however, a current transformer is already available for the purpose of determining the actual current value, then it is convenient to utilize this current transformer also for determining the current zero-axis crossing. For this purpose, however, the d-c voltage tapped after the rectifiers cannot be used directly for the following reason:

Before the current direction is reversed, the current flowing until then, as already mentioned, must be reduced to zero, before the current flowing in the opposite direction can become effective. A phase-controlled current, however, degenerates during zero-axis crossing into individual current pulses (interrupted current) which become increasingly smaller. Between these pulses the current is actually zero, so that during such a current rest time between two current pulses, current direction reversal can be initiated. One is now faced with the task of recognizing the beginning of such a current rest time through the preceding period in which the current becomes zero, in order to initiate current direction reversal. In this connection, the following fact is of importance:

From a preceding current pulse, the current transformer is magnetized to such an extent, that after the current reaches zero, a residual magnetic energy remains, the reduction of which acts on the secondary side (wit respect to the current direction up to this point) as a negative voltage pulse. If one were, as it is known, to obtain the actual current value at any given instance through rectification, then these negative voltage pulses would also be rectified and thus, simulate a current flow which actually does not exist.

Such voltage obtained by rectification would be unsuitable for recognizing a current zero-axis crossing, since these negative voltage pulses due to demagnetization, would also be represented positive and, since they fade asymptotically, would indicate an erroneous point of current zero-axis crossing. Thus, the precise time of the current zero-axis crossing could not be detected exactly, which would impair both the safety of operation and the dynamics.

FIG. 3a shows the course of the supply a-c voltage. In FIG. 3b, the voltage time area gained through phase-drive and after full-wave rectification for the motor supply is shown. FIG. 3c shows current pulses obtained from a single-phase current transformer, at the ends of which the voltage peaks occur, directed opposite to the direction of the pulse voltage due to the reduction of the residual magnetic energy. If these current pulses were rectified with a rectifier circuit, then the series of current pulses shown in FIG. 3e would result, the end voltage peaks of which would show the same polarity as the current pulses due to the rectification which is indicated with hatched lines. These rectified end voltage peaks, however, would make exact recognition of the current zero-axis crossing impossible and thus falsify the points of zero-axis crossing.

SUMMARY OF THE INVENTION

It is an object of the present invention to provide an apparatus for avoiding falsification of the zero-axis crossing points in phase-driven control circuits with current transformers, which current transformers are used additionally for the determination of the current zero-axis crossing.

The above and other objects are achieved by connecting a comparator circuit, serving for current zero-axis crossing detection, to the secondary of the current transformer via switches driven by a control stage for the motor current at the point of phase angles during the half waves of one of the polarities directly and during the half waves of the opposite polarity via inversion means, so that the motor current is only represented by one of the polarities, which results in unambiguous zero current determination by the comparator circuit.

The circuit according to the invention causes the comparator circuit, because of the controlled change-over of each half wave with each current zero-axis crossing, to receive an actual zero signal and subsequently even a signal which becomes negative, as it is shown in FIG. 3e in bold lines. In this way, a precise response of the comparator circuit at the time of zero-axis crossing and maintenance of the new state is achieved.

BRIEF DESCRIPTION OF THE DRAWINGS

The invention will be described in greater detail in the following detailed description with reference to the drawings, in which.

DETAILED DESCRIPTION

Figure 1:
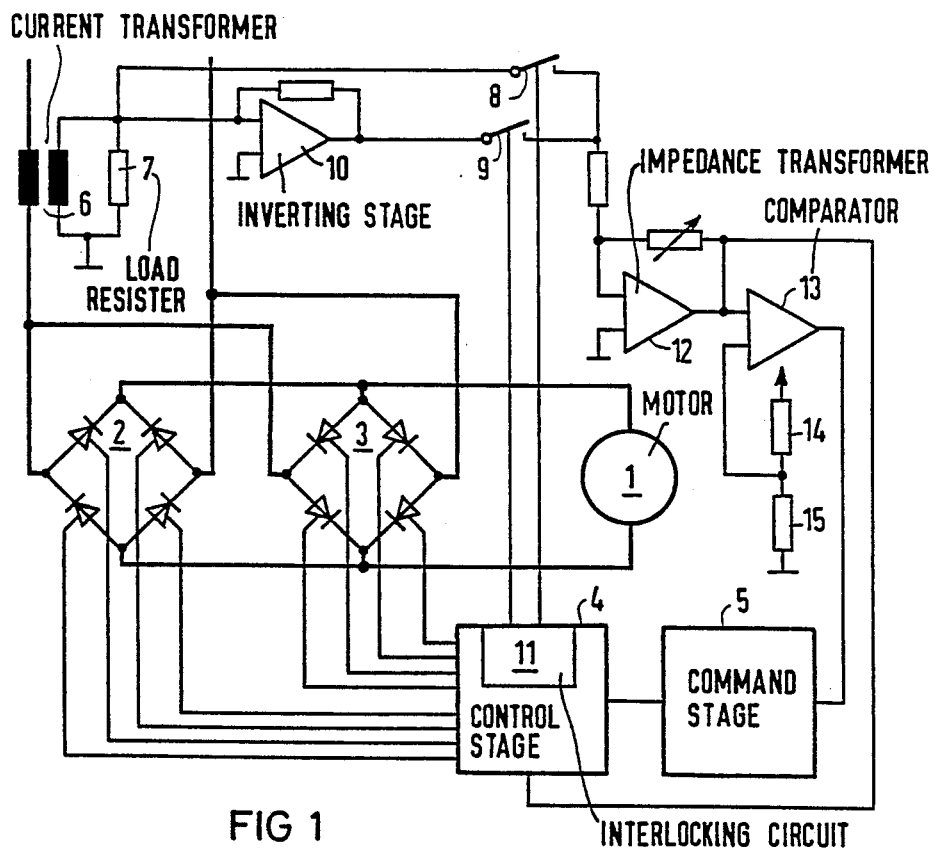
FIG. 1 shows an embodiment of the invention comprising a control circuit for a d-c motor 1, which is supplied from a single-phase supply and phase controlled.

With reference now to the drawings, in the embodiment according to FIG. 1, two thyristor driven rectifier bridges 2 and 3 are provided for supplying the motor 1 with d-c current of both directions. The thyristors of the bridges 2 and 3 are activated by a control stage 4 responsive to a command stage 5. The dimensioning of the current for the motor 1 takes place through phase angle control via the thyristors of the rectifier bridge 2 or 3 in operation at any given time. For this purpose, however, information about the actual value of the motor current at any given instance is required, which is obtained in the embodiment according to FIG. 1 from a current transformer 6 connected to the supply a-c circuit, the secondary voltage of which is tapped through a load resistor 7.

Figure 3:
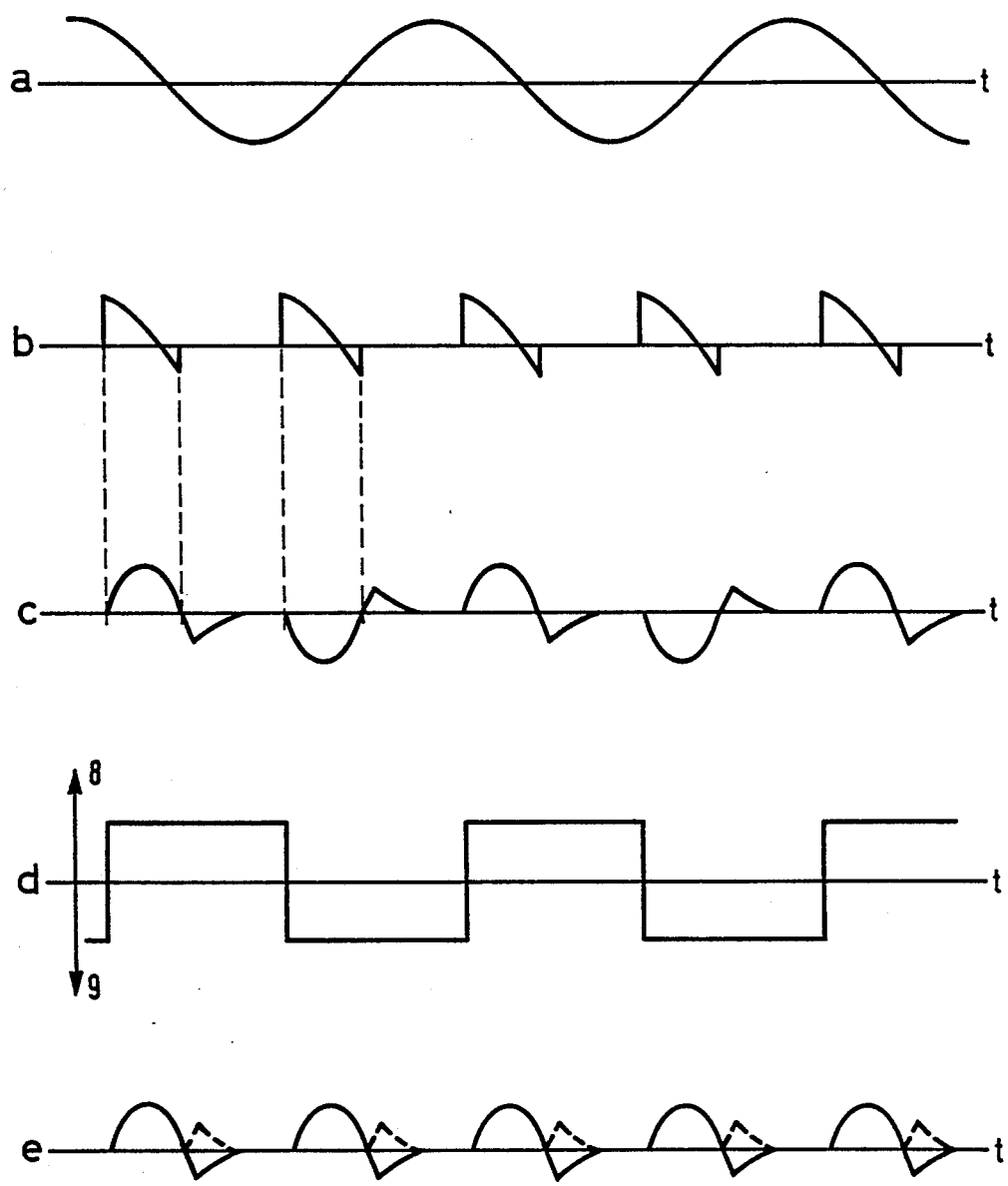
FIG. 3 comprises diagrams of the individual voltage and current signals to aid in understanding.

The a-c voltage tapped at the load resistor 7 consists of distinct current pulses of alternating polarity as shown in FIG. 3c. These are converted into current pulses of the same polarity through controlled switches 8, 9, as shown in FIG. 3e. The switch phases are shown in FIG. 3d. The polarity reversal of every second pulse occurs because the switches 8 and 9, respectively, are closed in each instance during one of the half periods and the pulses, moreover, are transmitted from switch 8 directly and via switch 9 through an inversion stage 10. The switches 8, 9 are closed alternatingly by the control stage 4 clocked by the frequency of the supply a-c voltage and specifically always at the point of the phase angle of the motor current. An interlocking circuit associated with the control stage 4 is indicated by reference numeral 11, which prevents the two switches 8 and 9 from being closed simultaneously. The pulses transmitted via switches 8 and 9 which are partially inverted, are transmitted to the input of an impedance transformer 12, which consists of a fed-back operational amplifier. The output pulses of the impedance transformer 12 are transmitted, on the one hand as information regarding the actual current value (for example the current rest time duration) to the control stage 4, and, on the other hand, for current zero-axis crossing detection to an additional operational amplifier 13, which acts as a comparator and whose non-inverting input is connected to the center tap of a voltage divider 14, 15, with the aid of which the setting-in point of the operational amplifier 13 is determined. This point lies slightly above zero voltage to compensate for the switch time lag during the zero-axis crossing determination. The output of the operational amplifier 13 comprises a pulse for each current zero-axis crossing, which is transmitted to the command stage 5 for further evaluation in case of a current direction reversal.

Figure 2:
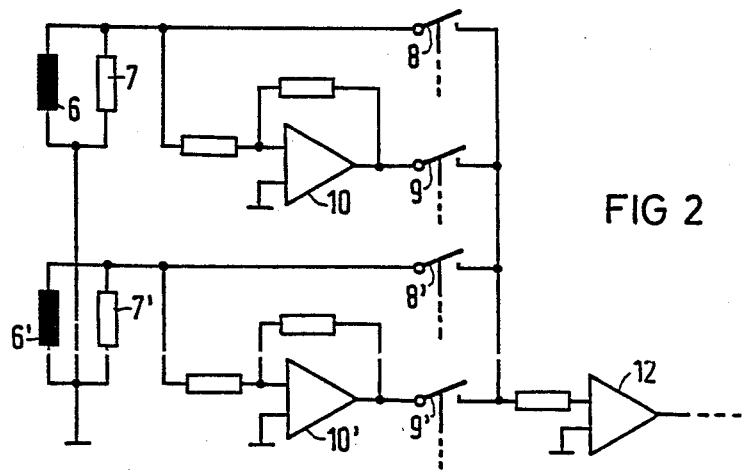
FIG. 2 shows a corresponding circuit for operation with a three-phase supply.

FIG. 2 shows the circuit for controlled rectification of the secondary voltage of two current transformers 6, 6', which are connected on the primary side to two phases of a three phase network supplying the motor and the secondary voltage of which is tapped to the associated load resistors 7, 7'. Here too, to each current transformer 6, 6' one controlled switch 8 or 8', respectively, is connected directly and a second controlled switch 9, 9', respectively, is connected, via an inversion stage 10, 10', respectively. As in the embodiment according to FIG. 1, the voltages through-connected by the switches 8, 8', 9, 9' are supplied to an impedance transformer 12 and then to a series-connected comparator, which analogously identifies the current zero-axis crossing with an output signal. In this circuit too, analagous to circuit 11 of FIG. 1, an electronic interlocking circuit is provided, which is composed of four multivibrators and ensures, that of the switches 8, 8', 9, 9', only one can be switched on at any given time.

In the foregoing specification, the invention has been described with reference to specific exemplary embodiments thereof. It will, however, be evident that various modifications and changes may be made thereunto without departing from the broader spirit and scope of the invention as set forth in the appended claim. The specification and drawings are, accordingly, to be regarded in an illustrative rather than in a restrictive sense.

What is claimed is:

1. A phase angle control circuit for an electric motor having control means for driving a plurality of thyristors of rectifier bridges, and further having current transformer means for the determination of an actual value of electrical current supplied to the motor by the bridges, said current transformer means coupled to an a-c supply, said current transformer means being utilized for determining a current zero-axis crossing before motor current reversal, and further for detecting a current rest time duration between pulses near the zero crossing, said circuit further comprising comparator means for detecting the current zero-axis crossing connected to a secondary of the current transformer means via switch means controlled by the control means for the motor current at the points of phase angles during half waves of one polarity of the a-c current directly such that the signal from the secondary is not inverted, and during the half waves of the opposite polarity of the a-c current via inversion means, so that the motor current is always represented by only one polarity which allows an unambigous zero current determination by the comparator means.

2. The phase angle control circuit recited in claim 1, wherein said current transformer means comprises a single current transformer coupled to a single phase a-c supply network.

3. The phase angle control circuit recited in claim 1, wherein said current transformer means comprises two current transformers coupled to a three phase a-c supply network.

* * * * *